United States Patent Office

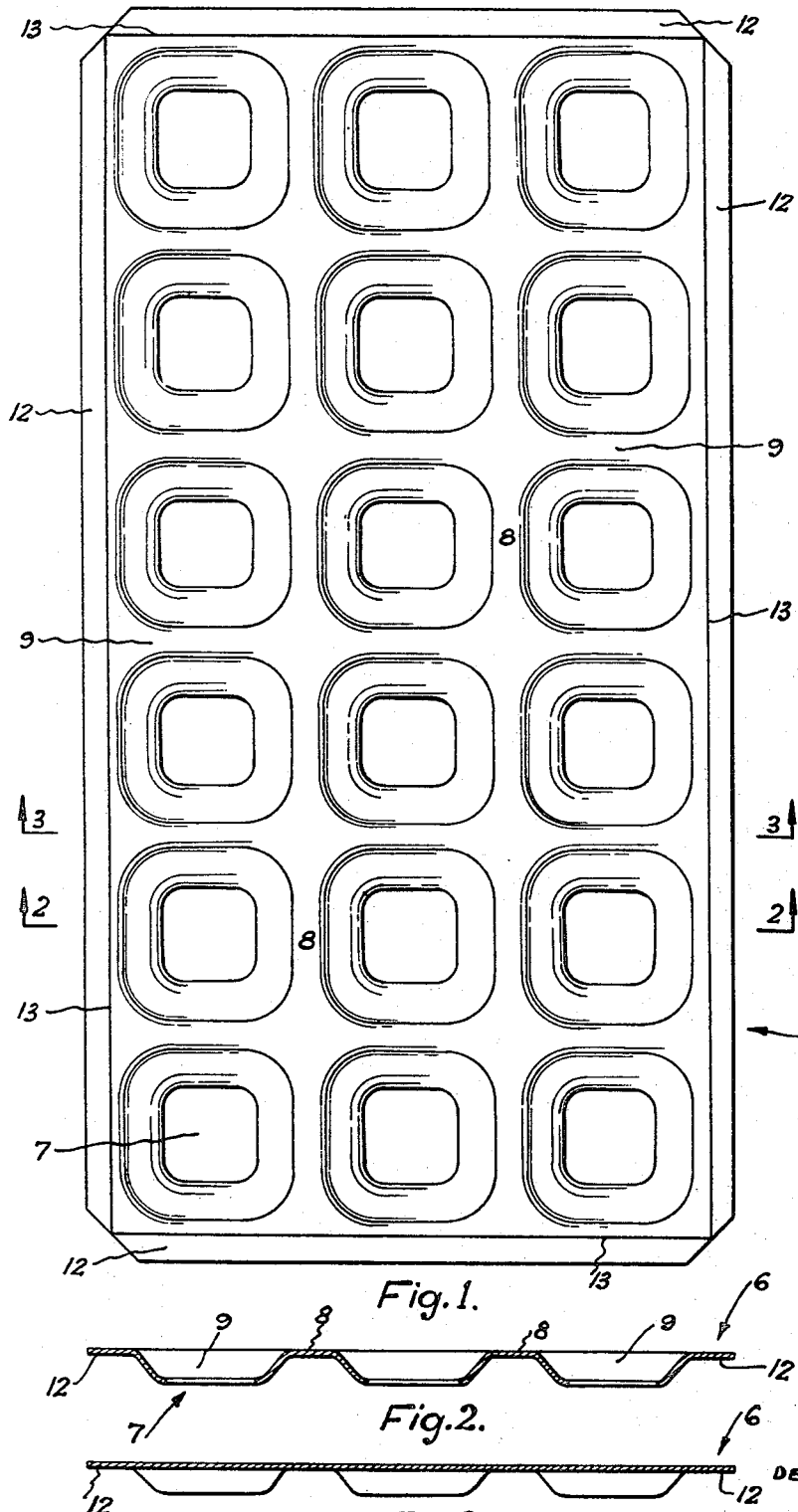

3,419,457
Patented Dec. 31, 1968

3,419,457
LAMINATED STRUCTURE WITH FORMER ELEMENT
Desmond Harold Bleasdale, 12 Griffin Road, North Curl Curl, New South Wales, Australia
Filed Aug. 6, 1965, Ser. No. 477,839
Claims priority, application Australia, Aug. 10, 1964, 47,949/64
6 Claims. (Cl. 161—102)

ABSTRACT OF THE DISCLOSURE

This invention provides for more economical construction of ribbed laminated structures in which a composite structure is made from two layers of reinforced plastic one elevated from the other in a pattern of ribs formed by laying the sceond layer upon a former sheet having the desired pattern of ribs impressed therein between rows of holes through which the second layer is bonded to the first.

---

In the manufacture of all kinds of sheet-like articles or articles having sheet-like portions it is commonplace to stiffen the article, or portions of the articles as the case may be, by means of ribs applied to one or both sides thereof. The present invention relates to the formation of such stiffening ribs and in particular to the formation of hollow stiffening ribs composed of a hard setting synthetic plastics material such as polyester resins, epoxy resins, or the like, preferably with reinforcing fibres, for example, glass fibres, embedded in the plastics material.

Articles of fibre reinforced plastics material, including hollow stiffening ribs thereof, may be made by "laying up," that is to say by placing a layer of woven or non-woven reinforcing fibres upon a mould surface and then painting or impregnating that layer with the hard-setting plastics material while in a liquid or pasty state and subsequently allowing or causing the plastics to set. Alternatively, a mixture of unset resin and short fibres may be applied to the mould surface in one operation.

Hitherto, hollow stiffening ribs of the kind under discussion have been made by applying bulky, low strength, ropes of paper, wooden slats or other cheap former elements, to one side of a sheet-like article or article portion and subsequently covering those elements with a layer of the settable rib material which sets and becomes bonded to the main body of the sheet intermediate the elements, but is held away from the main body by the elements so constituting filled but effectively hollow ribs.

While the above described method of providing stiffening ribs is generally satisfactory, it is not entirely so, primarily because of the difficulty of holding the former elements in position relative to each other, especially if it is desired to run stiffening ribs in two directions substantially at right angles to each other. The present invention was devised to facilitate the production of hollow ribs on sheets, sheet-like articles or sheet-like portions of other articles.

The invention achieves that object by providing a former comprising a foraminous sheet wherein the material of the sheet between each pair of neighbouring holes is elevated above a plane in which the rims of the holes are disposed.

According to preferred forms of the invention, a former comprises a grid of spaced-apart, arch-sectioned longitudinal members and spaced-apart, arch-sectioned transverse members; all said members being integrally united at their respective points of intersection.

By way of example one such preferred form of the invention is described hereinafter with reference to the accompanying drawings.

FIG. 1 is a plan view of a former according to the invention.

FIG. 2 is a sectional view taken on line 2—2 of FIG. 1, thickness increased for clarity of illustration.

FIG. 3 is a sectional view taken on line 3—3 of FIG. 1, thickness increased for clarity of illustration.

Figure 4:
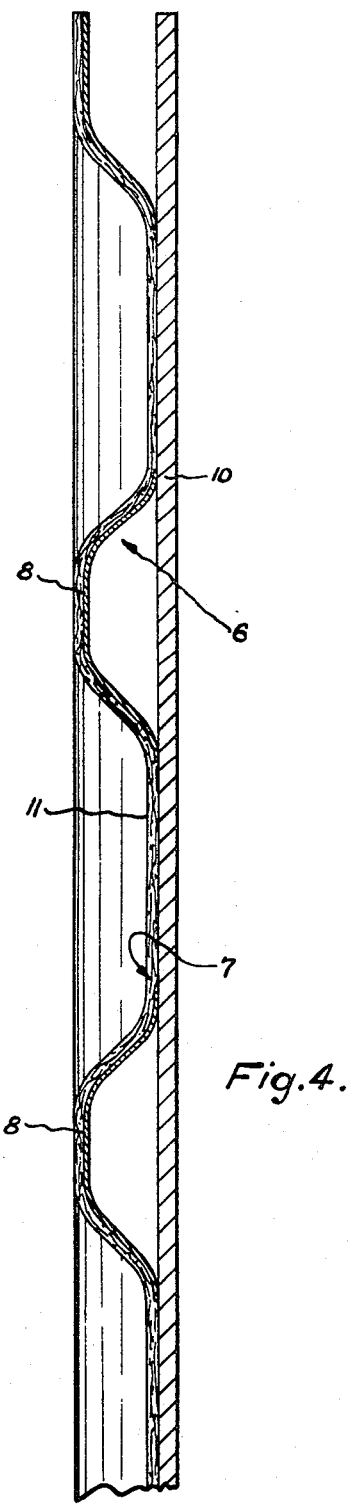
FIG. 4 is a sectional view similar to FIG. 2, but drawn to a larger scale, showing the same former as in use in a fibre reinforced resin article drawn to a larger scale.

The embodiment of the invention illustrated by the drawings may be vacuum-formed from a sheet 6 of plastic material, for example polyvinyl chloride, polystyrene, or co-polymers such as a co-polymer of vinyl chloride and acrylonitrile butadiene styrene. Alternatively it may be molded from papier mache or other inexpensive mouldable material.

The sheet 6 is pierced by a plurality of holes 7 arranged in an orderly array of intersecting rows and the material of the sheet 6 between the rows of holes 7 is elevated above the plane in which the rims of the holes 7 are disposed. Thus, the sheet material in effect constitutes a grid of spaced apart, arch-sectioned longitudinal members 8 and similar, spaced apart, arch-sectioned transverse members 9 which are integrally united with the members 8 at their respective points of intersection.

When the illustrated former is to be used it may be applied to a sheet 10 which itself may be made of fibre reinforced synthetic resin with the rims of the holes 7 in contact with the sheet 10 and the arch-sectioned members 8 and 9 projecting upwardly therefrom.

A layer 11 of fibre reinforced synthetic resin may then be applied to the exposed surface of the former so as to contact and bond with the sheet 10 through the holes 7. Once those parts of the layer 11 which are supported by the members 8 and 9 set, they constitute stiffening ribs on the original sheet 10.

Figure 5:
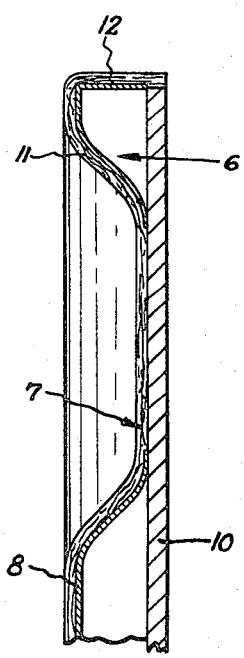
FIG. 5 is a view similar to FIG. 4 but showing an edge portion of the former and article.

For preference, the former has edge flanges 12 extending along at least one edge defined by score lines 13 such that the edge flanges 12 may readily be folded (as shown in FIG. 5) to a position where they are substantially perpendicular to the plane of the hole rims and where the tips of the flanges lie in or near that plane to facilitate the formation of a hollow edge rib on the finished article.

Furthermore, in those instances in which it is necessary to use a former larger than a single element, that is to say, when two elements are to be used side by side, their contiguous edge flanges 12 may be folded as aforesaid brought into abutment and stapled or otherwise secured together.

According to other examples of the invention the above described and illustrated arcuately arched members may be replaced by other arched members of rectangular, triangular, or other cross-sectional shape.

In some cases it may be desirable to have a greater spacing between the longitudinal members than between the transverse members or vice versa.

If the former is to be applied to a sheet of sharp curvature, it may be preferable for the members to be split, corrugated, indented or otherwise conditioned in a manner rending them more flexible thereby to facilitate the bending of the former required when applying it to a curved surface.

Materials other than those mentioned above may be used, it being appreciated that the former itself requires very little strength, merely enough to support a thin layer of resinous material and, even then, only for so long as is necessary for the resin of that layer of material to set.

According to other examples of the invention holes in the foraminous sheet may be irregularly or randomly disposed and may be of differing shapes and/or sizes.

Finally it should be mentioned that plastic layers supported or formed on formers according to the invention may be sandwiched between two sheets to constitute a light-weight, rigidifying filling or core for composite panel structures or the like.

I claim:
1. In a light weight laminated structure of generally hollow construction,
   a first layer of fiber-reinforced plastic material forming a lower skin portion of said structure,
   a former element comprising a foraminous sheet having a plurality of holes each each defined by a rim, the rims of the holes being in contact with said lower skin and the material of the sheet between each pair of adjacent holes being elevated above said lower skin,
   a second skin portion comprising a layer of fiber-reinforced plastic material overlying said former element and conforming to the surface of said element disposed away from said lower skin, said second skin portion being bonded to said lower skin portion through at least some of said holes.

2. In a structure according to claim 1, said former element material being shaped as a grid of spaced apart, arch-sectioned longitudinal members and spaced apart, arch-sectioned transverse members integrally united at their respective points of intersection.

3. In a structure according to claim 1, a rigid boundary for said structure comprising a flange along at least one edge of said former element and a flange portion of said second skin conforming to said flange of the former element extending to said lower skin portion.

4. In a structure according to claim 1, said former element being of flexible plastic sheeting.

5. A structure according to claim 1 wherein said holes are arranged in rows, said material of said former element elevated above said lower skin is in the form of arcuately shaped ribs and the portion of said second skin overlying said arcuately shaped ribs forms integrally connected stiffening ribs.

6. A structure according to claim 5 wherein said holes are arranged in rows and columns.

References Cited

UNITED STATES PATENTS

| | | | |
|---|---|---|---|
| 691,804 | 1/1902 | Parker | 161—109 |
| 2,650,185 | 5/1950 | Larson et al. | 161—113 XR |
| 3,214,319 | 10/1965 | Graham | 161—127 XR |
| 3,231,454 | 1/1966 | Williams | 161—112 XR |

ROBERT F. BURNETT, *Primary Examiner.*

R. H. CRISS, *Assistant Examiner.*

U.S. Cl. X.R.

161—109, 114, 119